(12) United States Patent
Chen et al.

(10) Patent No.: US 9,975,457 B2
(45) Date of Patent: May 22, 2018

(54) CHILD SAFETY SEAT

(71) Applicant: BP CHILDREN'S PRODUCTS HK CO., LIMITED, Wanchai (HK)

(72) Inventors: Ying-Zhong Chen, Wanchai (CN); Zu Jian Liu, Wanchai (CN)

(73) Assignee: BP Children's Products HK Co., Ltd., Hong Kong (HK)

( * ) Notice: Subject to any disclaimer, the term of this patent is extended or adjusted under 35 U.S.C. 154(b) by 0 days. days.

(21) Appl. No.: 15/344,386

(22) Filed: Nov. 4, 2016

(65) Prior Publication Data

US 2017/0129370 A1    May 11, 2017

(30) Foreign Application Priority Data

Nov. 6, 2015  (CN) .......................... 2015 1 0757603

(51) Int. Cl.
| | |
|---|---|
| *B60N 2/26* | (2006.01) |
| *B60N 2/28* | (2006.01) |
| *B60N 2/22* | (2006.01) |

(52) U.S. Cl.
CPC ......... *B60N 2/2878* (2013.01); *B60N 2/2227* (2013.01); *B60N 2/2845* (2013.01)

(58) Field of Classification Search
CPC ... B60N 2/2878; B60N 2/2845; B60N 2/2227
USPC .......................... 297/256.13, 256.16, 354.13
See application file for complete search history.

(56) References Cited

U.S. PATENT DOCUMENTS

| | | | | |
|---|---|---|---|---|
| 3,054,637 | A * | 9/1962 | Pambello ............. | A47D 11/005 224/155 |
| 4,274,674 | A * | 6/1981 | Deloustal ............... | B60N 2/286 297/256.13 |
| 4,762,364 | A * | 8/1988 | Young ................... | B60N 2/2821 297/256.13 X |
| 4,805,928 | A * | 2/1989 | Nakao ...................... | B62B 7/08 280/47.4 |

(Continued)

FOREIGN PATENT DOCUMENTS

| | | | |
|---|---|---|---|
| DE | 4344812 A1 * | 7/1995 | .......... B60N 2/2803 |
| DE | 202011000229 U1 | 7/2011 | |

(Continued)

OTHER PUBLICATIONS

Search Report from co-pending EP Patent Application No. 16197346.6 dated Mar. 31, 2017.

(Continued)

*Primary Examiner* — Rodney B White
(74) *Attorney, Agent, or Firm* — Daniel A. Tallitsch; Baker McKenzie LLP

(57) ABSTRACT

A child safety seat includes a base for providing support on a vehicle seat, a child support assembly coupled with the base, the child support assembly including a seat portion and a backrest portion pivotally connected with each other, the child support assembly being adjustable relative to the base between a sitting position and a recumbent position, a latch operable to lock the child support assembly with the base in the sitting position or the recumbent position, and an actuator operatively connected with the latch, the actuator being operable to cause the latch to unlock for adjustment of the child support assembly between the sitting position and the recumbent position.

26 Claims, 16 Drawing Sheets

(56) References Cited

U.S. PATENT DOCUMENTS

| | | | | |
|---|---|---|---|---|
| 4,998,307 A * | 3/1991 | Cone | B60N 2/2806 | |
| | | | 297/256.13 X | |
| 5,092,004 A * | 3/1992 | Cone | B60N 2/2806 | |
| | | | 297/354.13 X | |
| 5,115,523 A * | 5/1992 | Cone | B60N 2/2806 | |
| | | | 297/256.13 | |
| 5,201,535 A * | 4/1993 | Kato | B62B 7/123 | |
| | | | 280/30 | |
| 5,496,092 A * | 3/1996 | Williams | A61F 5/3792 | |
| | | | 297/354.13 X | |
| 5,524,964 A * | 6/1996 | Weimersheimer | B60N 2/14 | |
| | | | 297/354.13 X | |
| 5,681,084 A * | 10/1997 | Yoneda | A47D 1/002 | |
| | | | 297/354.13 X | |
| 6,082,818 A * | 7/2000 | Muller | B60N 2/28 | |
| | | | 297/354.13 X | |
| 6,196,629 B1 * | 3/2001 | Onishi | B60N 2/2806 | |
| | | | 297/354.13 X | |
| 6,334,652 B1 * | 1/2002 | Chen | A47D 1/002 | |
| | | | 297/256.13 | |
| 6,679,552 B1 * | 1/2004 | Kassai | B60N 2/2812 | |
| | | | 297/250.1 | |
| 6,773,065 B1 * | 8/2004 | Stamper | A47D 5/006 | |
| | | | 297/256.13 X | |
| 7,364,232 B2 * | 4/2008 | Mees van der Bijl | B60N 2/2821 | |
| | | | 297/183.4 | |
| 7,364,235 B2 * | 4/2008 | Chen | A47D 1/002 | |
| | | | 297/354.13 X | |
| 7,625,043 B2 * | 12/2009 | Hartenstine | B60N 2/2806 | |
| | | | 297/256.1 X | |
| 7,918,497 B2 * | 4/2011 | Keegan | A47D 1/008 | |
| | | | 297/354.13 X | |
| 9,610,869 B1 * | 4/2017 | Holley, Jr. | B60N 2/2881 | |
| 9,738,182 B2 * | 8/2017 | Pos | B60N 2/2878 | |
| 2003/0011221 A1 * | 1/2003 | Yoshie | A47D 1/002 | |
| | | | 297/354.13 X | |
| 2005/0029852 A1 * | 2/2005 | Chen | A47D 1/002 | |
| | | | 297/354.13 X | |

FOREIGN PATENT DOCUMENTS

| | | | |
|---|---|---|---|
| EP | 0853018 A1 | 7/1998 | |
| EP | 2281714 A1 | 9/2011 | |
| JP | H10-250426 | 9/1998 | |
| JP | 3081291 U * | 10/2001 | A47D 13/02 |
| JP | 2006-305351 A | 11/2006 | |
| JP | 2012-020686 A | 2/2012 | |
| JP | 2014-505554 A | 3/2014 | |
| TW | 201202075 A1 | 1/2012 | |

OTHER PUBLICATIONS

Oct. 17, 2017 Office Action in co-pending JP Patent Application No. 2016-216157.

* cited by examiner

CHILD SAFETY SEAT

CROSS-REFERENCE TO RELATED APPLICATION(S)

This application claims priority to China Patent Application No. 201510757603.0 filed on Nov. 6, 2015, the disclosure of which is incorporated herein by reference.

BACKGROUND

1. Field of the Invention

The present invention relates to child safety seats.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. Therefore, safety legislations require the use of a child safety seat for seating a young child in a vehicle. The seatbelt of the vehicle can be used to secure the child safety seat which has a harness more adapted to restrain the young child.

The child safety seat can be made of a rigid body having a seat portion and a backrest portion for supporting a child. The rigid body of the child safety seat generally does not allow placing a child in any position other than an upright sitting position, which may limit its use.

Therefore, there is a need for a child safety seat that can be more flexible in use, and address at least the foregoing issues.

SUMMARY

The present application describes child safety seats that can be convertible between a sitting position and a recumbent position. According to one embodiment, the child safety seat includes a base for providing support on a vehicle seat, a child support assembly coupled with the base, the child support assembly including a seat portion and a backrest portion pivotally connected with each other, the child support assembly being adjustable relative to the base between a sitting position and a recumbent position, a latch operable to lock the child support assembly with the base in the sitting position or the recumbent position, and an actuator operatively connected with the latch, the actuator being operable to cause the latch to unlock for adjustment of the child support assembly between the sitting position and the recumbent position.

According to another embodiment, the child safety seat includes a base for providing support on a vehicle seat, a child support assembly coupled with the base, the child support assembly including a seat portion and a backrest portion pivotally connected with each other about a pivot connection, the seat portion having a left and a right side respectively connected movably with the base, and the pivot connection being displaced relative to the base when the child support assembly is adjusted relative to the base between a first and a second position, a latch operable to lock the child support assembly with the base in the first or second position, and an actuator operatively connected with the latch, the actuator being operable to cause the latch to unlock for adjustment of the child support assembly between the first and second position.

DETAILED DESCRIPTION OF THE EMBODIMENTS

Figure 1:
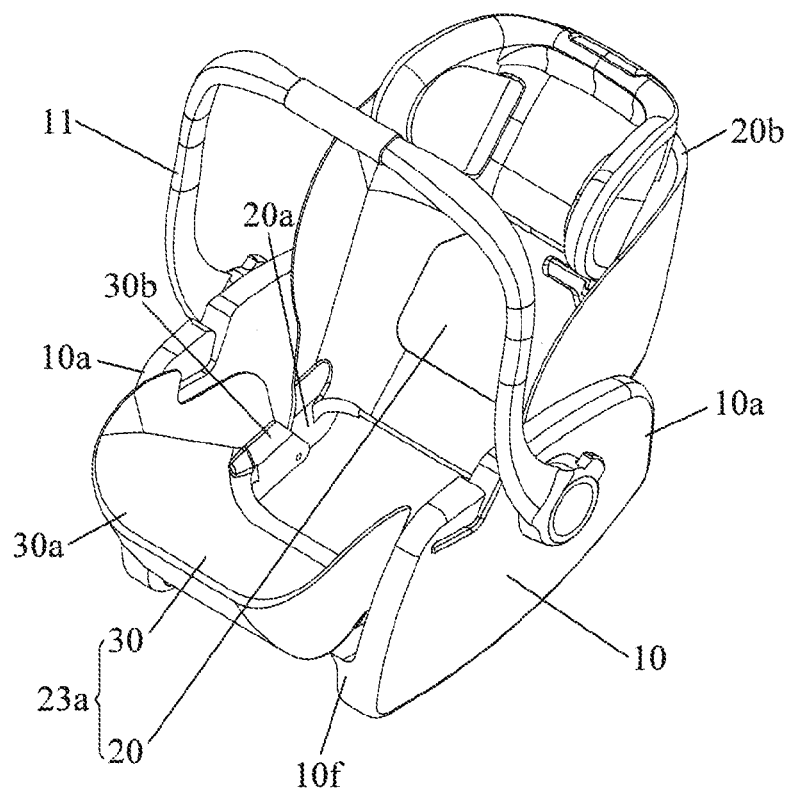
FIG. 1 is a schematic perspective view illustrating one embodiment of a child safety seat in a sitting position.

Referring to FIGS. 1-6, a child safety seat 100 can include a base 10, and a child support assembly 23a coupled with the base 10. The base 10 can provide support for the child safety seat 100 on a vehicle seat. For example, the base 10 can have a bottom capable of resting in a stable manner on the vehicle seat. Moreover, the base 10 can have a left and a right sidewall 10a delimiting an interior for placement of the child support assembly 23a. A carrying handle 11 may be assembled with the base 10 for facilitating portability of the child safety seat 100. The carrying handle 11 may be pivotally connected with a left and a right side of the base 10.

Figure 2:
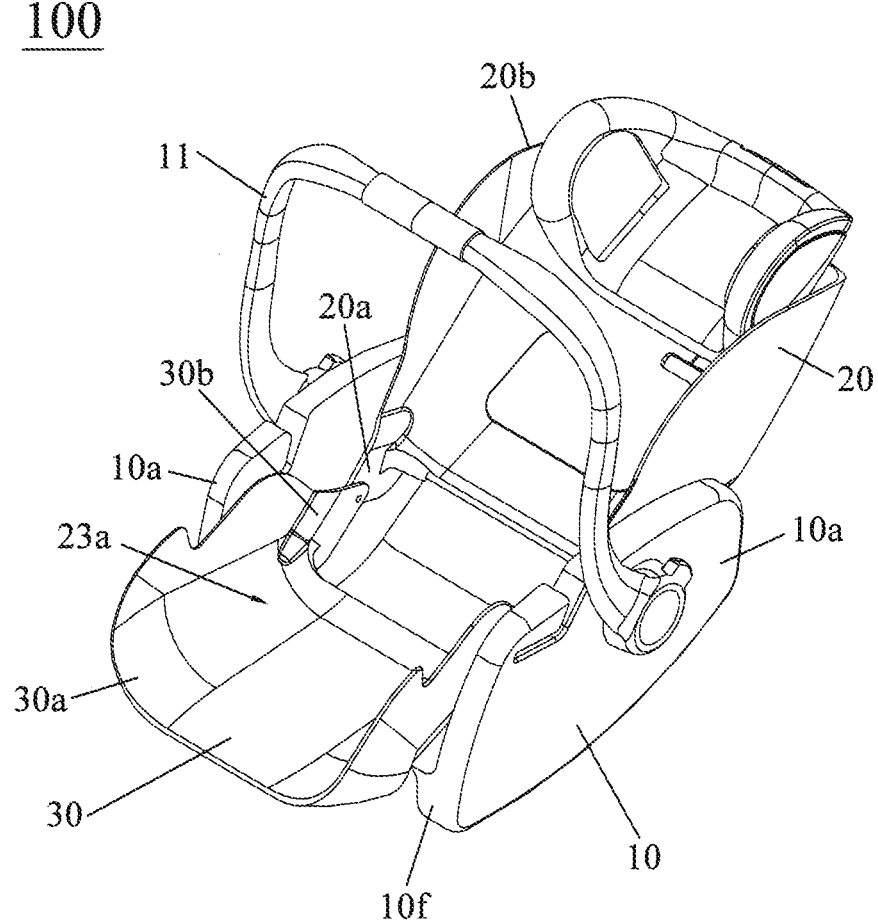
FIG. 2 is a schematic perspective view illustrating the child safety seat of FIG. 1 in a recumbent position.
Figure 3:
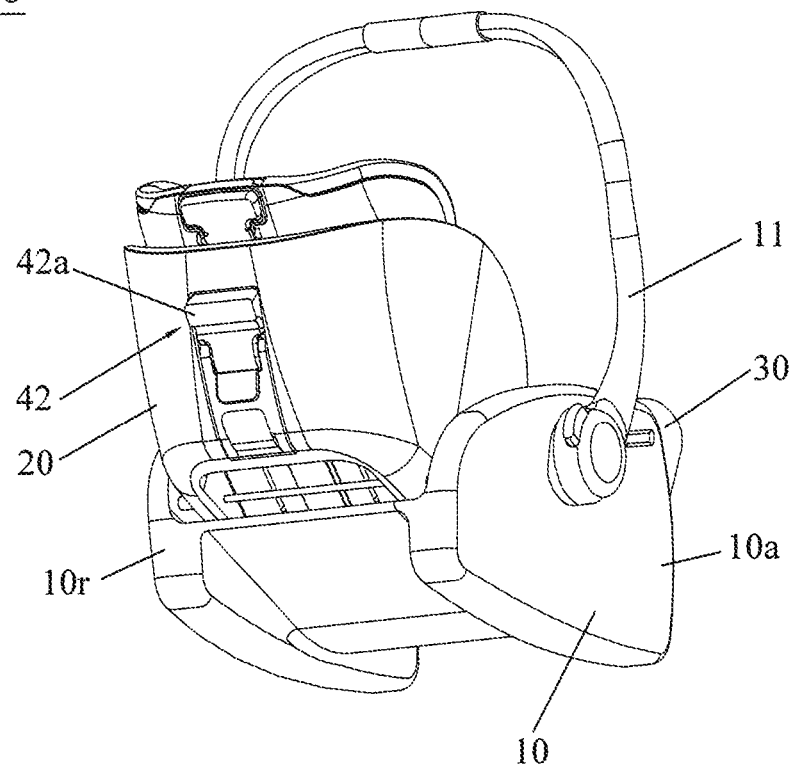
FIG. 3 is a perspective view illustrating a rear of the child safety seat shown FIG. 1.
Figure 6:
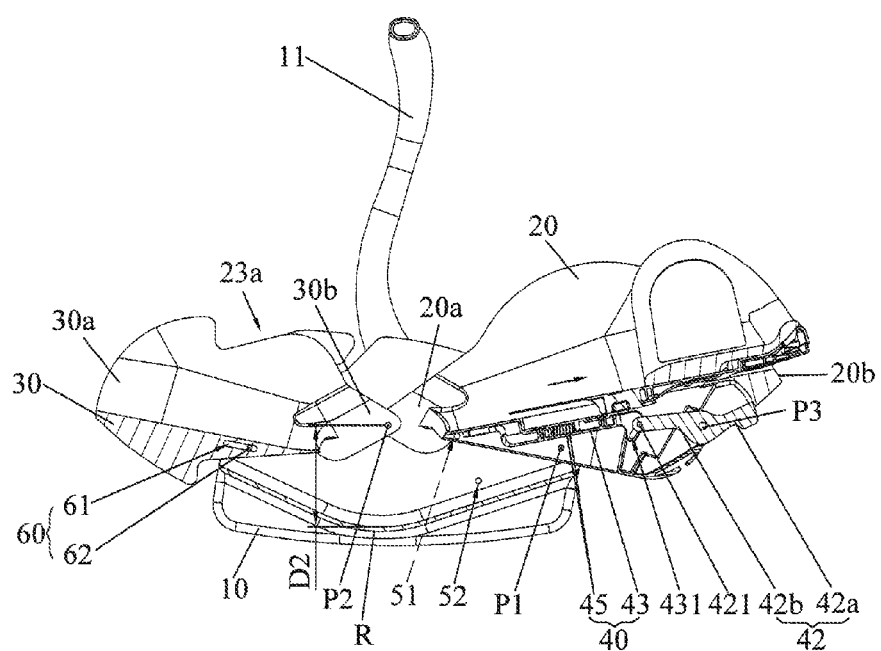
FIG. 6 is a cross-sectional view of the child safety seat in the recumbent position.

The child support assembly 23a includes a backrest portion 20 and a seat portion 30, and is adjustable relative to the base 10 between an upright or sitting position (better shown in FIGS. 1 and 4) and a recumbent position (better shown in FIGS. 2 and 6). The backrest portion 20 can be pivotally connected with the base 10 via a pivot connection P1. The pivot connection P1 may include a shaft portion that is affixed with one of the base 10 and the backrest portion 20 so as to define a pivot axis about which the backrest portion 20 can rotate relative to the base 10. The pivot connection P1 can extend transversally, and can be exemplary disposed in a region between a front end 20a and a rear end 20b of the backrest portion 20. Moreover, the backrest portion 20 can project rearward beyond a rear end 10r of the base 10.

The seat portion 30 is pivotally connected with the backrest portion 20 about a pivot connection P2, and can extend forward beyond a front end 10f of the base 10. The pivot connection P2 may exemplary include a shaft portion that is affixed with one of the backrest portion 20 and the seat portion 30 so as to define a pivot axis about which the seat portion 30 and the backrest portion 20 can rotate relative to each other. The pivot connection P2 may exemplary couple the front end 20a of the backrest portion 20 with a rear end 30b of the seat portion 30, and can be located forward relative to and lower than the pivot connection P1.

Referring to FIGS. 1-4 and 6, the seat portion 30 can further have a left and a right side respectively connected movably with the two sidewalls 10a of the base 10 via two sliding connections 60. Each sliding connection 60 can include a guide slot 61 provided on one of the base 10 and the seat portion 30, and a shaft portion 62 that is fixedly connected with the other one of the base 10 and the seat portion 30. The shaft portion 62 is slidably assembled through the guide slot 61, and is located forward relative to the pivot connection P1. According to one example of construction, the guide slot 61 may be provided on the seat portion 30, and the shaft portion 62 can be fixedly connected with the base 10. It will be appreciated, however, that the locations of the guide slot 61 and the shaft portion 62 may be interchanged, i.e., the guide slot may be provided on the base 10 and the shaft portion may be fixedly connected with the seat portion 30.

With the aforementioned assembly, the backrest portion 20 and the seat portion 30 are movably coupled with each other, and can rotate relative to each other and move relative to the base 10 during adjustment of the child support assembly 23a between the sitting position and the recumbent position. For example, for switching the child support assembly 23a between the sitting position and the recumbent position, a caregiver may apply a force on the backrest portion 20 so as to cause its rotation about the pivot connection P1, which in turn can urge the seat portion 30 to rotate relative to the backrest portion 20 and at the same time move backward or forward relative to the base 10. For switching the child support assembly 23a between the sitting position and the recumbent position, the caregiver may also alternatively apply a force on the seat portion 30 so as to cause its rotation and sliding backward or forward relative to the base 10, which in turn urges the backrest portion 20 to rotate about the pivot connection P1. The shaft portion 62 can slide along the guide slot 61 for allowing smooth forward or rearward sliding of the seat portion 30 relative to the base 10 during adjustment of the child support assembly 23a between the sitting position and the recumbent position. Moreover, the adjustment of the child support assembly 23a between the sitting position and the recumbent position can displace the pivot connection P2 vertically relative to the base 10. The sitting position of the child support assembly 23a can be set, e.g., when the child safety seat 100 is attached on a vehicle seat for seating a child. The recumbent position of the child support assembly 23a can be set, e.g., when the child safety seat 100 is not attached to a vehicle seat and is used for providing a comfortable environment to help a child to sleep.

Figure 4:
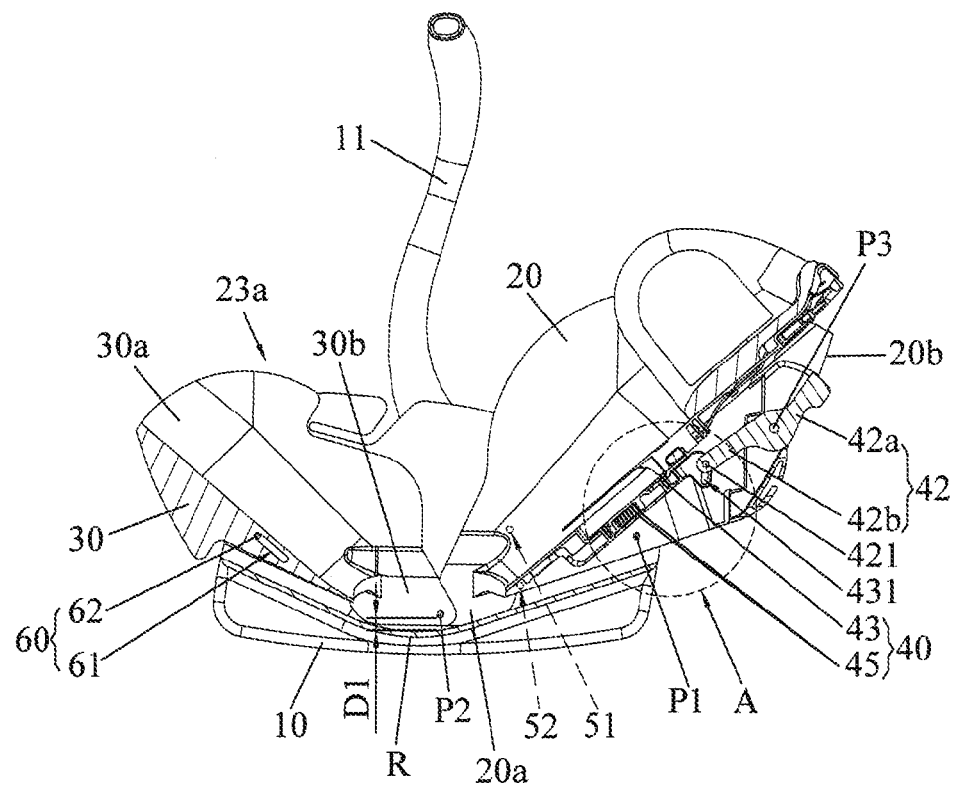
FIG. 4 is a cross-sectional view of the child safety seat shown FIG. 1 in the sitting position.
Figure 7:
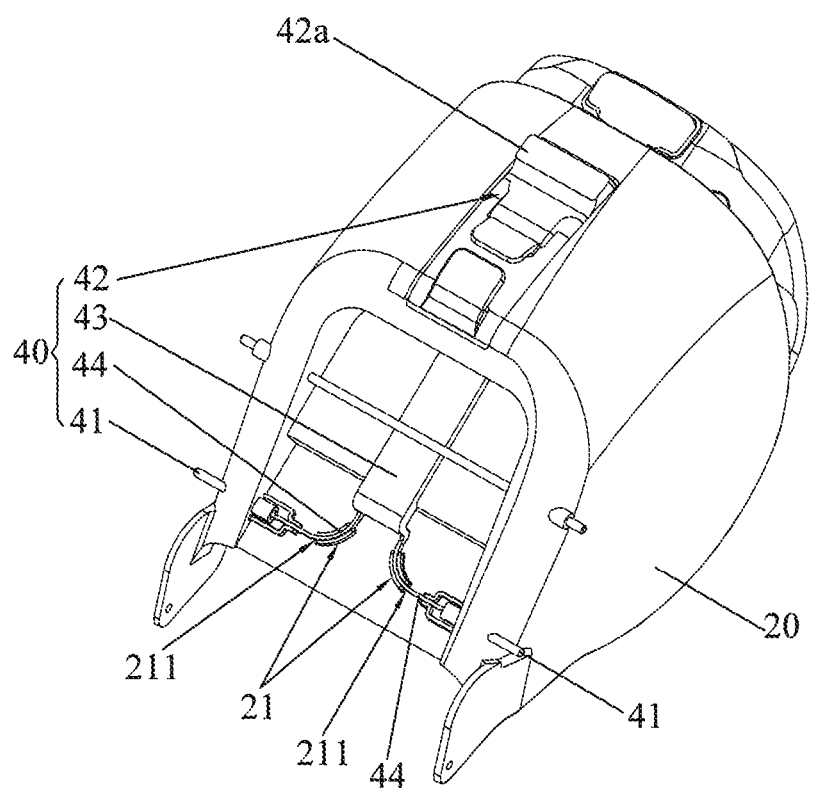
FIG. 7 is a schematic view illustrating a latch mechanism provided on a backrest portion of the child safety seat shown in FIG. 1.

Referring to FIGS. 4, 6 and 7, the child safety seat 100 can further include a latch mechanism 40 for locking the child support assembly 23a in position. The latch mechanism 40 can include two latches 41, an actuator 42, a linkage 43 and two resilient arms 44. The two latches 41 are operable to lock the child support assembly 23a with the base 10 in the sitting position or the recumbent position, and can be exemplary assembled with the child support assembly 23a. More specifically, the two latches 41 can exemplary have a pin shape, and can be respectively assembled with the backrest portion 20 of the child support assembly 23a for sliding transversally in opposite directions relative to the backrest portion 20 at a left and a right side thereof. The two latches 41 can thereby protrude at the left and right side of the child support assembly 23a to respectively engage with the two sidewalls 10a of the base 10 for locking the child support assembly 23a in the sitting or recumbent position, and retract toward the interior of the child support assembly 23a to disengage from the two sidewalls 10a of the base 10 for adjustment of the child support assembly 23a between the sitting and recumbent position.

Referring to FIGS. 4 and 6, each sidewall 10a of the base 10 can respectively include two openings 51 and 52 respectively associated with the recumbent position and the sitting position, the opening 51 being disposed above the opening 52. The two latches 41 can respectively engage with the two openings 51 provided on the two sidewalls 10a of the base 10 for locking the child support assembly 23a in the recumbent position, and with two openings 52 provided on the two sidewalls 10a of the base 10 for locking the child support assembly 23a in the sitting position.

The actuator 42 is operatively connected with the two latches 41, and is operable to cause the two latches 41 to unlock for adjustment of the child support assembly 23a between the sitting position and the recumbent position. More specifically, the actuator 42 can be pivotally connected with the backrest portion 20 of the child support assembly 23a via a pivot connection P3, and can include an operating end 42a and a coupling end 42b. The pivot connection P3 can include a shaft portion that defines a pivot axis about which the actuator 42 can rotate for urging the two latches 41 to move for disengaging from the base 10. The operating end 42a may be exposed outward for manual operation.

The coupling end 42b of the actuator 42 can be pivotally connected with an upper end of the linkage 43, which is placed centrally relative to the backrest portion 20. More specifically, the upper end of the linkage 43 can include a guide slot 431, which extends at an angle relative to a sliding axis of the linkage 43 (i.e., corresponding to the direction of the arrow in the backrest portion 20 as shown in FIG. 6). The coupling end 42b of the actuator 42 can be affixed with a pin 421 that is pivotally assembled through the guide slot 431 and can slide along the guide slot 431. It will be appreciated that an alternate construction for coupling the actuator 42 with the linkage 43 may also provide the guide slot 431 on the coupling end 42b of the actuator 42, and the pin 421 can be affixed with the upper end of the linkage 43 and assembled through the guide slot 431. In this manner, rotation of the actuator 42 about the pivot connection P3 can be coupled with upward or downward sliding of the linkage 43 relative to the backrest portion 20.

A lower end of the linkage 43 can be connected with the two resilient arms 44. Each resilient arm 44 can be made of an elastically deformable material, and can have a curved shape that is oppositely connected with the linkage 43 and one latch 41 associated therewith. The two resilient arms 44 can respectively bend from the linkage 43 in opposite directions toward the left and right side of the backrest portion 20 for connecting with the latches 41 respectively associated therewith.

Referring to FIG. 7, the backrest portion 20 can further include two symmetric guide structures 21 for respectively guiding the two resilient arms 44 in sliding movement. Each guide structure 21 can respectively include two protruding ribs that define a curved passage 211. The two resilient arms 44 can be respectively disposed through the two passages 211 in sliding contact with the guide structures 21. This sliding contact can facilitate elastic bending of the two resilient arms 44.

Figure 5:
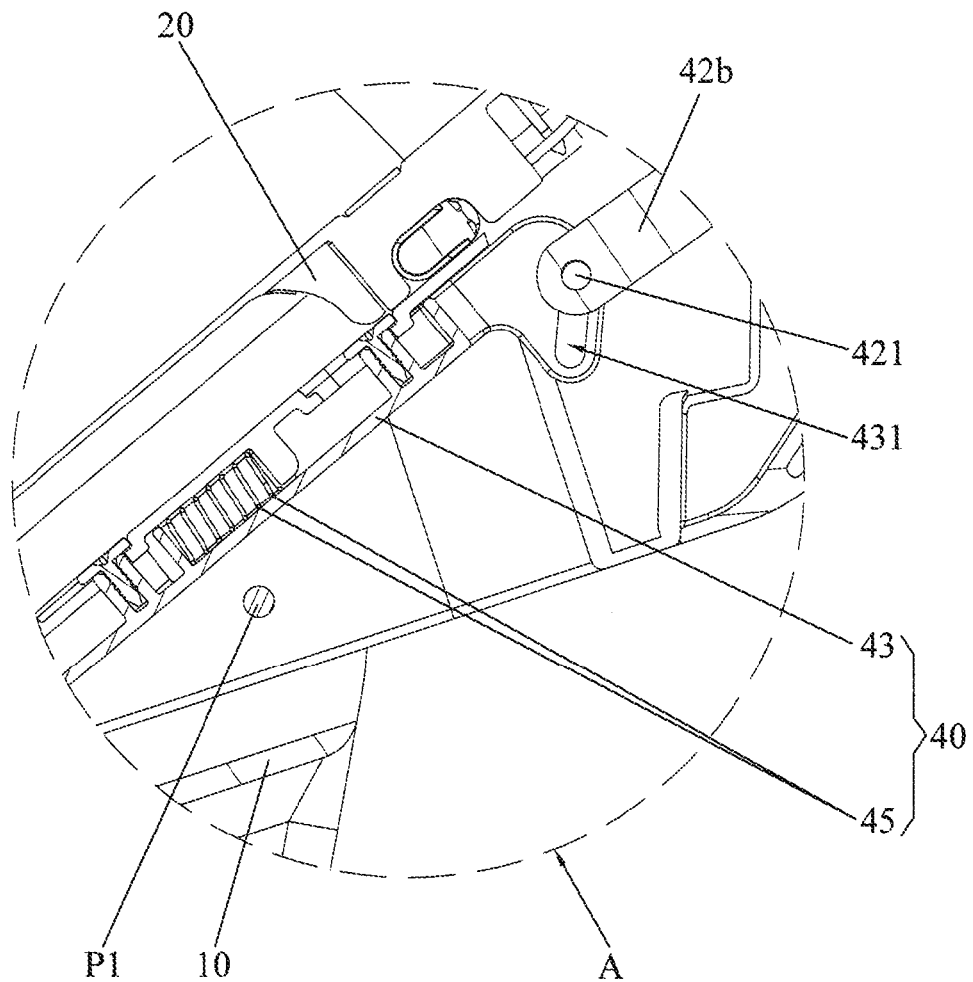
FIG. 5 is an enlarged view of portion A shown in FIG. 4.

As shown in FIG. 5, the backrest portion 20 of the child support assembly 23a can be further provided with a spring 45 operable to apply a spring force for biasing the latches 41 toward a locking state. The spring 45 can be respectively connected with the linkage 43 and the backrest portion 20. The spring 45 can be exemplary a compression spring or a drawing spring. The spring 45 can bias the linkage 43 downward so as to urge the two resilient arms 44 for pushing the two latches 41 toward a locking state.

With the aforementioned construction, the biasing force applied by the spring 45 can urge the two latches 41 to engage with the base 10 for locking the child support assembly 23a in the recumbent position or sitting position. Moreover, the actuator 42 can be operated to cause upward sliding of the linkage 43 and the two resilient arms 44, which can drive the two latches 41 to slide concurrently for disengaging from the base 10 and thereby unlocking the child support assembly 23a for adjustment.

It will be appreciated that the latch mechanism for locking the child support assembly 23a in position is not limited to the aforementioned construction. For example, a variant construction can have the actuator 42 and the linkage 43 replaced with an actuator formed integrally as a single part that is slidably assembled with the backrest portion 20 and is directly connected with the two resilient arms 44. With this other construction, upward sliding of the actuator can directly drive an unlocking movement of the two latches 41.

Rather than having the latches 41 and the actuator 42 assembled with the child support assembly 23a, another construction may also have the latches and the actuator assembled with the base 10, the latches being movable to engage or disengage openings provided on the child support assembly 23a for locking or unlocking the child support assembly 23a. Furthermore, the embodiments are not limited to the aforementioned openings 51 and 52 for locking the recumbent position and the sitting position, and more openings may be provided for locking the child support assembly 23a in any desirable recline positions.

Exemplary operation for converting the child safety seat 100 between the recumbent position and the sitting position is described hereinafter with reference to FIGS. 1-7. Suppose that the child support assembly 23a of the child safety seat 100 is in the sitting position as shown in FIGS. 1 and 4. In this configuration, the two latches 41 can respectively engage with the openings 52 on the two sidewalls 10a of the base 10, which locks the child support assembly 23a in the sitting position. Moreover, the pivot connection P2 can be located in a position that is located above a reference surface R of the base 10 by a vertical distance D1 (better shown in FIG. 4).

For converting the child safety seat 100 from the sitting position of FIGS. 1 and 4 to the recumbent position of FIGS. 2 and 6, a caregiver first operates the operating end 42a of the actuator 42, which causes the actuator 42 to rotate about the pivot connection P3 and thereby pull the linkage 43 to slide upward relative to the backrest portion 20. This upward displacement of the linkage 43 can compress the spring 45 and pull the two resilient arms 44 to slide upward, which respectively bend and urge the two latches 41 to move transversally toward each other for disengaging from the openings 52. The child support assembly 23a is thereby unlocked from the base 10.

For setting the recumbent position, the caregiver then can rotate the backrest portion 20 about the pivot connection P1 so as to displace its front end 20a and the pivot connection P2 upward, which urges the seat portion 30 to rotate and slide forward relative to the base 10. Alternatively, the caregiver may displace the seat portion 30 forward, which urges the backrest portion 20 to rotate for displacing its front end 20a and the pivot connection P2 upward. As the child support assembly 23a moves from the sitting position toward the recumbent position, the latches 41 and the actuator 42 can move along with the backrest portion 20 relative to the base 10 and the seat portion 30. Once the recumbent position is reached, the caregiver can release the actuator 42 so that the spring 45 can urge the linkage 43 to slide downward to its initial position. This downward movement of the linkage 43 allows the actuator 42 to recover its initial position and can push the two resilient arms 44 downward, which respectively bend and urge the two latches 41 to move transversally away from each other for engaging with the openings 51. The child safety seat 100 is thereby locked in the recumbent position.

The pivot connection P2 is higher in the recumbent position than in the sitting position. For example, the vertical distance D2 from the pivot connection P2 to the reference surface R of the base 10 in the recumbent position (better shown in FIG. 6) is greater than the vertical distance D1 from the pivot connection P2 to the reference surface R of the base 10 in the sitting position. Moreover, the front end 30a of the seat portion 30 can be displaced forward.

For switching the child safety seat 100 from the recumbent position back to the sitting position, a caregiver operates the actuator 42 as previously described to cause the two latches 41 to disengage from the openings 51 and thereby unlock the child support assembly 23a. Then the backrest portion 20 can be rotated about the pivot connection P1 in a direction that moves the pivot connection P2 and the front end 20a of the backrest portion 20 downward, which drives the seat portion 30 to move rearward. Alternatively, the caregiver may also move the seat portion 30 rearward so as to drive rotation of the backrest portion 20 about the pivot connection P1 in a direction that moves the pivot connection P2 and the front end 20a of the backrest portion 20 downward. Once the sitting position is reached, the caregiver can release the actuator 42 so that the biasing force applied by the spring 45 can cause the latches 41 to respectively engage with the openings 52, thereby locking the child support assembly 23a in the sitting position.

Figure 8:
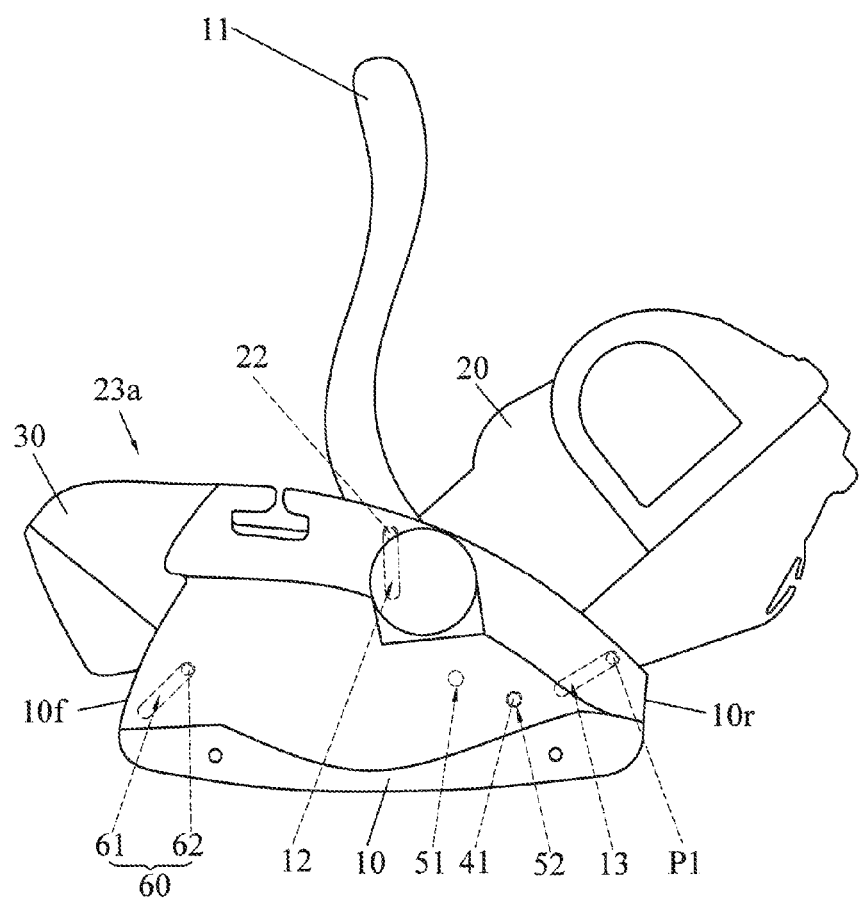
FIG. 8 is a schematic view illustrating a variant construction of the child safety seat in the sitting position.
Figure 9:
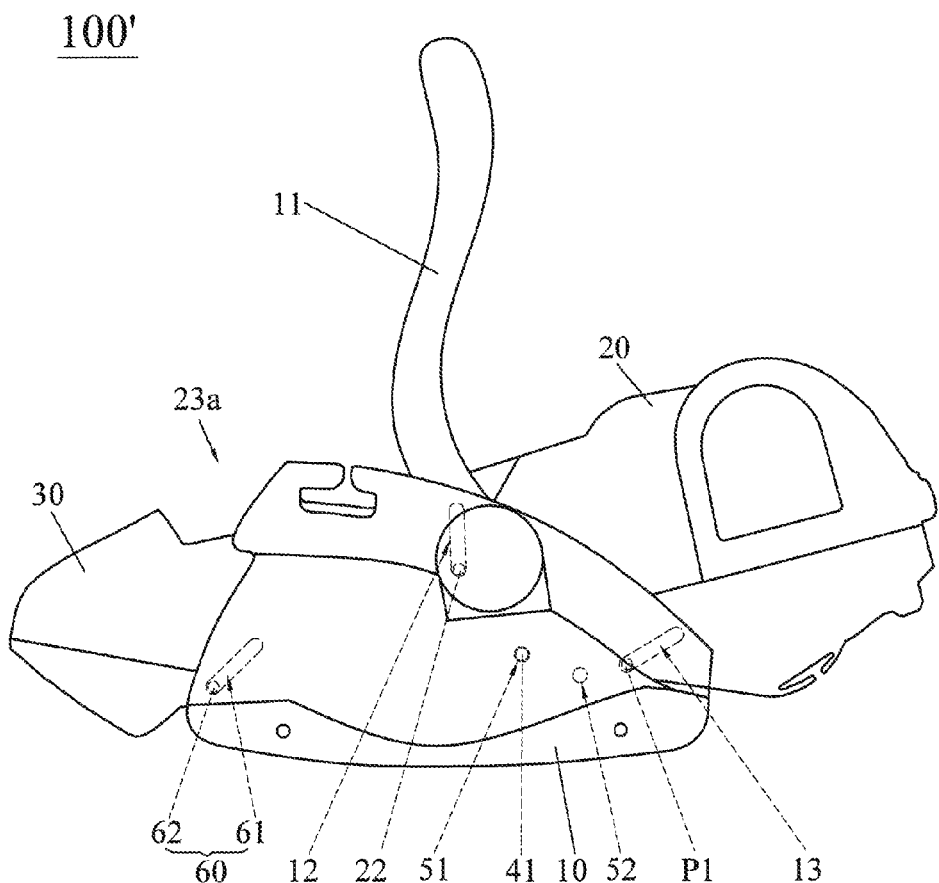
FIG. 9 is a schematic view illustrating the child safety seat of FIG. 8 in the recumbent position.

FIGS. 8 and 9 are schematic views illustrating a variant construction of a child safety seat 100'. The child safety seat 100' shown in FIGS. 8 and 9 is substantially similar to the child safety seat 100 described previously. A difference is that the child safety seat 100' includes further sliding connections coupling the base 10 with the backrest portion 20. Referring to FIGS. 8 and 9, the additional sliding connections can include two guide slots 12 and 13 provided on each of a left and a right inner side of the base 10. The guide slot 12 can be located forward relative to the pivot connection P1 in a middle region between the front end 10f and the rear end 10r of the base 10, and can extend generally vertically. The other guide slot 13 can be disposed behind the guide slot 12, and can rise at an angle toward the rear of the base 10. Each of a left and a right side of the backrest portion 20 can be respectively connected fixedly with a shaft portion 22 that is located forward relative to the pivot connection P1 and is slidably assembled through the corresponding guide slot 12. Moreover, the shaft portion of the pivot connection P1 can be attached with the backrest portion 20 and slidably assembled through the corresponding guide slots 13. During adjustment of the child support assembly 23a between the recumbent position and the sitting position, the shaft portion 22 and the pivot connection P1 can respectively slide along the two guide slots 12 and 13, which can guide and facilitate smooth rotation and forward or rearward displacement of the backrest portion 20 relative to the base 10.

It will be appreciated that the sliding connections for the backrest portion 20 may be implemented with some variant construction. For example, the two guide slots 12 and 13 may be provided on each of the left and right side of the backrest portion 20, and the shaft portion 22 and the shaft portion of the pivot connection P2 can be respectively attached on the base 10. This variant construction may likewise allow smooth forward or rearward displacement of the backrest portion 20 relative to the base 10 during movement of the child support assembly 23a between the recumbent position and the sitting position.

Like previously described, the latch 41 on each of the left and right sides can engage with the corresponding opening 52 for locking the child support assembly 23a in the sitting position (as shown in FIG. 8), and with the corresponding opening 51 for locking the child support assembly 23a in the recumbent position (as shown in FIG. 9).

FIGS. 10-16 are schematic views illustrating another construction of a child safety seat 100". The child safety seat 100" shown in FIGS. 10-16 is substantially similar to the child safety seat 100 described previously. A difference is that the latch mechanism 40' of the child safety seat 100' for locking the child support assembly 23a in the sitting or recumbent position differs from the latch mechanism 40 described previously. The latch mechanism 40' can include two latches 41', an actuator 42', two resilient arms 44' and a spring 45'. Because the two latches 41' and the two resilient arms 44' are symmetric, only one of the two latches 41' and one of the two resilient arms 44' are represented in the cross-sectional views of FIGS. 12, 14 and 15 for clarity of illustration. Moreover, the representation of the seat portion 30 is partially omitted in FIG. 14 to better show the latch 41' and other features included in the child safety seat 100".

The two latches 41' are operable to lock the child support assembly 23a with the base 10 in the sitting position or the recumbent position, and are assembled with the seat portion 30 of the child support assembly 23a. More specifically, the two latches 41' can exemplary have a pin shape, and can be respectively assembled with the seat portion 30 for sliding transversally in opposite directions relative to the seat portion 30 at a left and a right side thereof. For a compact assembly, the two latches 41' may be movable along a transversal axis that is coaxial to the axis of the pivot connection P2 that couples the backrest portion 20 with the seat portion 30. The two latches 41' can protrude at the left and right side of the child support assembly 23a to respectively engage with the two sidewalls 10a of the base 10 for locking the child support assembly 23a in the sitting or recumbent position, and retract toward the interior of the child support assembly 23a to disengage from the two sidewalls 10a of the base 10 for adjustment of the child support assembly 23a between the sitting and recumbent position.

Figure 14:
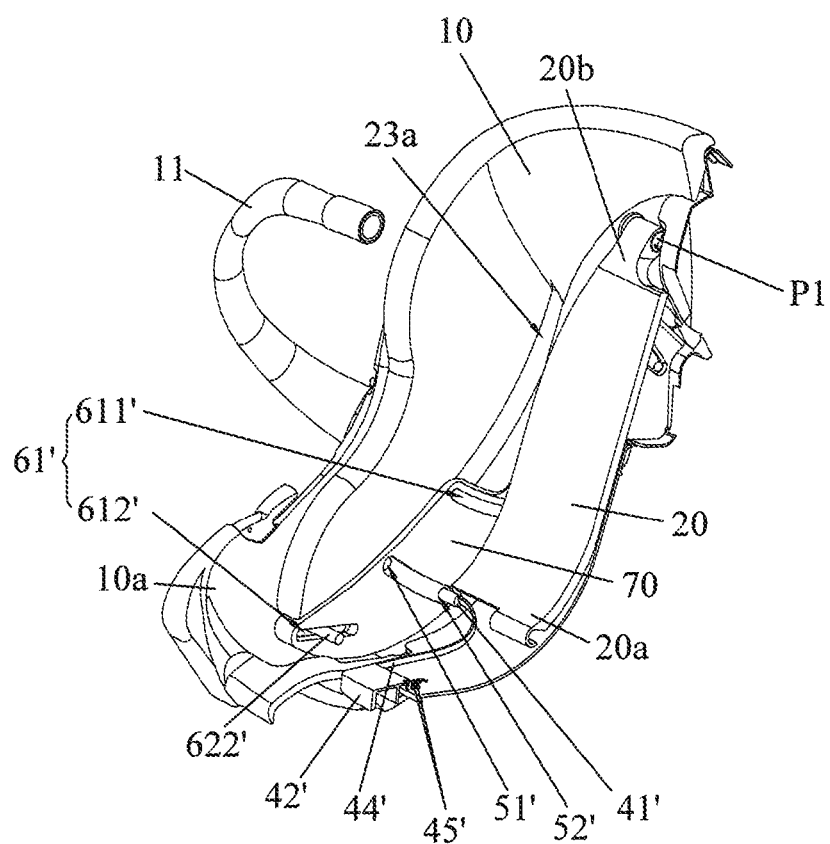
FIG. 14 is a schematic cross-sectional view illustrating some sliding connections for coupling a backrest portion and a seat portion with the base in the child safety seat of FIG. 10.

Referring to FIG. 14, each sidewall 10a of the base 10 can respectively include two openings 51' and 52' respectively associated with the recumbent position and the sitting position, the opening 51' being disposed above the opening 52'. The two latches 41' can respectively engage with the two openings 51' for locking the child support assembly 23a in the recumbent position, and with two openings 52' for locking the child support assembly 23a in the sitting position.

The actuator 42' is operatively connected with the two latches 41', and is operable to cause the two latches 41' to unlock for adjustment of the child support assembly 23a between the sitting position and the recumbent position. More specifically, the actuator 42' can be assembled with the seat portion 30 in a central region thereof for back and forth sliding movement, and can be exposed at a front of the seat portion 30 for manual operation.

The two resilient arms 44' can be made of an elastically deformable material. Each resilient arm 44' can have a curved shape that is oppositely connected with the actuator 42' and one latch 41' associated therewith. More specifically, the two resilient arms 44' can respectively bend from the actuator 42' in opposite directions toward the left and right side of the seat portion 30 for connecting with the two latches 41' respectively associated therewith. The latches 41', the actuator 42' and the resilient arms 44' can be assembled in an interior of the seat portion 30, which can be upwardly closed with a cover 31.

The spring 45' is respectively connected with the seat portion 30 and the actuator 42', and can bias the actuator 42' toward an initial position corresponding to a locking state of the latches 41'.

Rather than having the latches 41' and the actuator 42' assembled with the seat portion 30 of the child support assembly 23a, another construction may also have the latches and the actuator assembled with the base 10, the latches being movable to engage or disengage openings provided on the seat portion 30 for locking or unlocking the child support assembly 23a.

Figure 12:
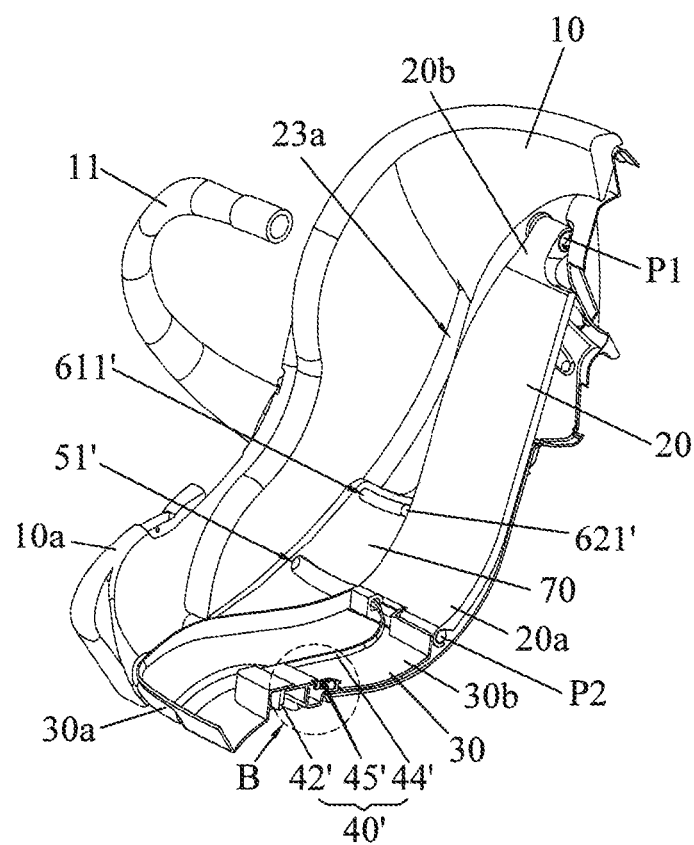
FIG. 12 is a schematic cross-sectional view illustrating a latch mechanism provided in the child safety seat of FIG. 10, the child safety seat being shown in the sitting position in FIG. 12.
Figure 13:
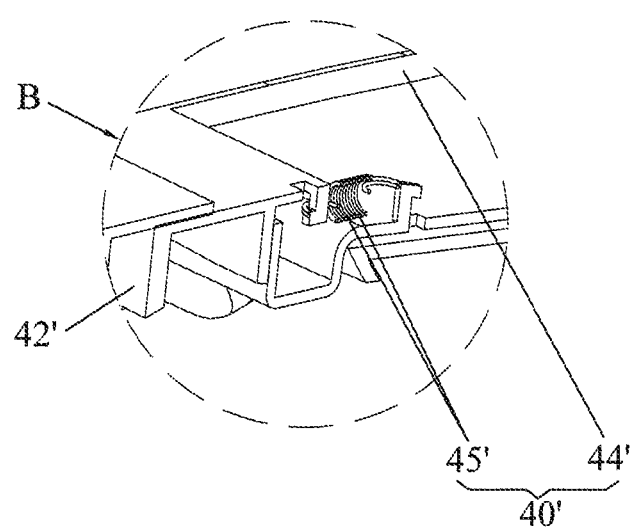
FIG. 13 is an enlarged view of portion B shown in FIG. 12.

Referring to FIGS. 12 and 14, the rear end 20b of the backrest portion 20 can be pivotally connected with the base 10 about a pivot connection P1, and the front end 20a of the backrest portion 20 can be pivotally connected with the rear end 30b of the seat portion 30 via a pivot connection P2. Moreover, the child safety seat 100" can further include sliding connections 61' for respectively coupling the backrest portion 20 and the seat portion 30 with the base 10. The sliding connections 61' can include two guide slots 611' and 612' provided on each of a left and a right inner side of the base 10. For example, each of the left and right sidewall 10a of the base 10 can respectively have a fixed sidewall 70, and the two guide slots 611' and 612' can be provided on the sidewall 70. The two openings 51' and 52' may be provided in a region of the sidewall 70 between the two guide slots 611' and 612'. Each of the left and right sides of the backrest portion 20 can be respectively connected fixedly with a shaft portion 621' disposed between the rear end 20b and the front end 20a of the backrest portion 20. Each shaft portion 621' is slidably assembled through one corresponding guide slot 611' Likewise, each of the left and right sides of the seat portion 30 can be respectively affixed with a shaft portion 622' (better shown in FIG. 14) that is disposed between the rear end 30b and the front end 30a of the seat portion 30 and is slidably assembled through one corresponding guide slot 612'. During adjustment of the child support assembly 23a between the sitting position and the recumbent position, the shaft portions 621' of the backrest portion 20 and the shaft portions 622' of the seat portion 30 can respectively slide along the guide slots 611' and 612', which can guide and facilitate smooth rotation and forward or rearward displacement of the backrest portion 20 and the seat portion 30 relative to the base 10.

It will be appreciated that the sliding connections for coupling the backrest portion 20 and the seat portion 30 with the base 10 are not limited to the aforementioned construction. For example, a variant construction may respectively provide the guide slots 611' and 612' on the backrest portion 20 and the seat portion 30, and the shaft portions assembled therewith may be fixedly connected with the base 10. This variant construction may likewise guide and allow smooth displacement of the backrest portion 20 and the seat portion 30 relative to the base 10 during adjustment of the child support assembly 23a between the sitting position and the recumbent position.

Figure 10:
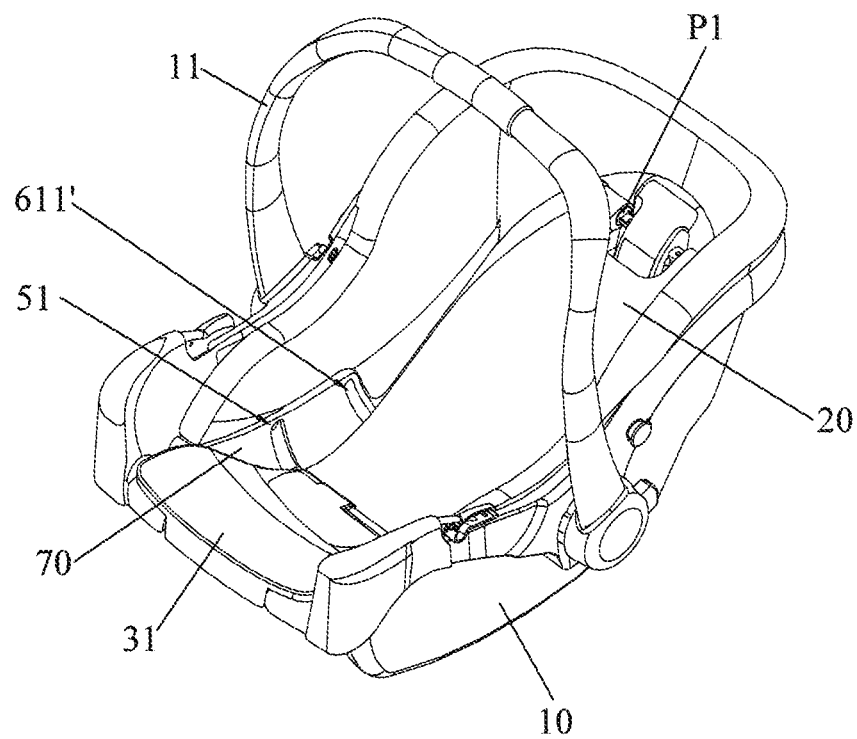
FIG. 10 is a schematic view illustrating another embodiment of a child safety seat in a sitting position.

Exemplary operation for converting the child safety seat 100" between the recumbent position and the sitting position is described hereinafter with reference to FIGS. 10-16. Suppose that the child support assembly 23a of the child safety seat 100" is in the sitting position as shown in FIGS. 10, 12 and 14. In this configuration, the two latches 41' can respectively engage with the openings 52' on the two sidewalls 10a of the base 10, which locks the child support assembly 23a in the sitting position.

Figure 11:
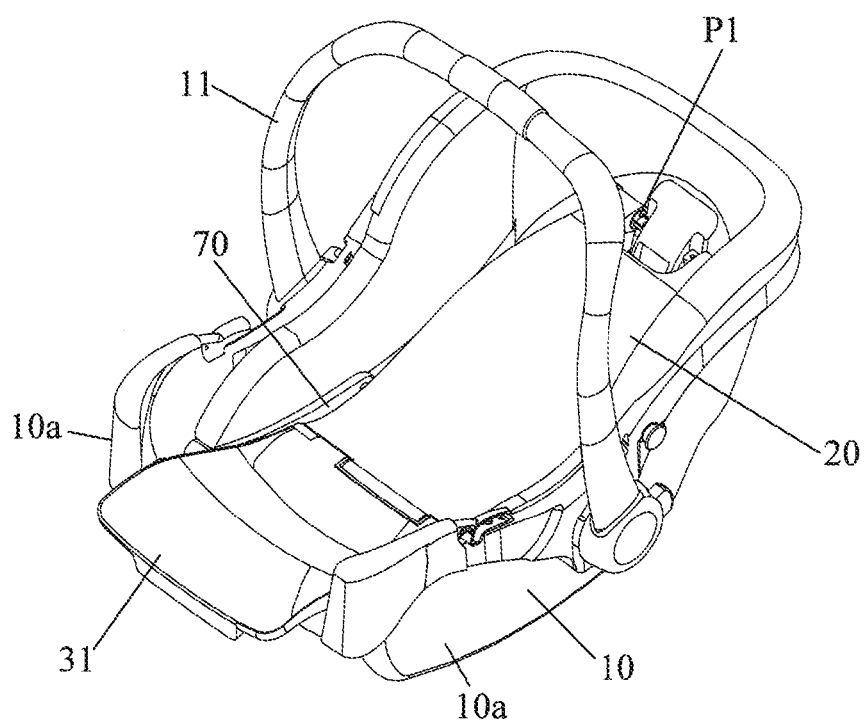
FIG. 11 is a schematic view illustrating the child safety seat of FIG. 10 in the recumbent position.
Figure 15:
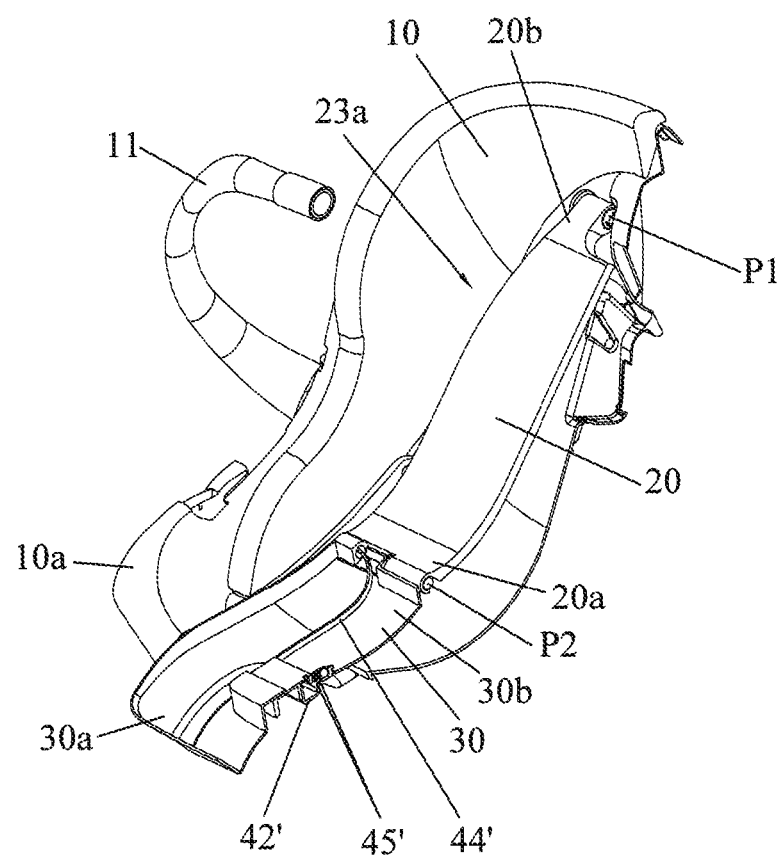
FIG. 15 is a schematic cross-sectional view illustrating the child safety seat of FIG. 10 in the recumbent position.
Figure 16:
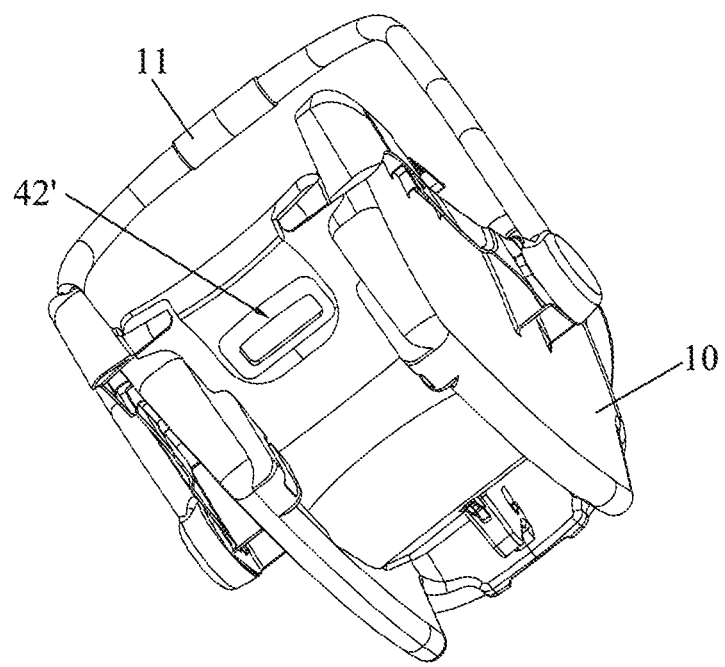
FIG. 16 is a perspective view illustrating a rear of the child safety seat of FIG. 10.

For switching the child support assembly 23a from the sitting position to the recumbent position shown in FIGS. 11 and 15, a caregiver first pulls the actuator 42' to slide forward. This forward displacement of the actuator 42' can stretch the spring 45' and pull the two resilient arms 44' forward, which respectively bend and urge the two latches 41' to move transversally toward each other for disengaging from the openings 52' of the base 10. The child support assembly 23a is thereby unlocked from the base 10.

For setting the recumbent position, the caregiver then can pull the seat portion 30 forward, which urges the backrest portion 20 to rotate about the pivot connection P1 for displacing its front end 20a and the pivot connection P2 upward. As the child support assembly 23a moves from the sitting position toward the recumbent position, the latches 41' and the actuator 42' can move along with the seat portion 30 relative to the base 10 and the backrest portion 20. Once the recumbent position is reached, the caregiver can release the actuator 42' so that the spring 45' can urge the actuator 42' to slide rearward to its initial position. This rearward movement of the actuator 42' can push the two resilient arms 44' rearward, which respectively bend and urge the two latches 41' to move transversally away from each other for engaging with the openings 51'. The child support assembly 23a is thereby locked in the recumbent position.

For switching the child support assembly 23a from the recumbent position to the sitting position, the actuator 42' can operated as described previously for unlocking the child support assembly 23a. Then the seat portion 30 can be pushed rearward, which urges the backrest portion 20 to rotate about the pivot connection P1 for displacing its front end 20a and the pivot connection P2 downward. As the child support assembly 23a moves from the recumbent position toward the sitting position, the latches 41' and the actuator 42' can move along with the seat portion 30 relative to the base 10 and the backrest portion 20. Once the sitting position is reached, the caregiver can release the actuator 42' so that the spring 45' can urge the actuator 42' to slide rearward to its initial position and thereby cause the two latches 41' to move transversally away from each other for engaging with the openings 52'. The child support assembly 23a is thereby locked in the sitting position.

Advantages of the child safety seats described herein include a child support assembly that can be adjusted to different positions according to the needs. In particular, the child support assembly of the child safety seat can have a sitting position that may be set for safely seating a child in a vehicle, and a recumbent position that may be set for providing comfortable support to a child.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a base for providing support on a vehicle seat, the base having a sidewall provided with a first opening and a second opening, the first opening being located above the second opening when the base rests on an external surface in a use configuration;
   a child support assembly coupled with the base, the child support assembly including a seat portion and a backrest portion pivotally connected with each other, the child support assembly being adjustable relative to the base between a sitting position and a recumbent position;
   a latch coupled with the child support assembly and operable to lock the child support assembly with the base in the sitting position or the recumbent position, the latch being disengaged from the second opening and engaged with the first opening to lock the child support assembly in the recumbent position, the latch being disengaged from the first opening and engaged with the second opening to lock the child support assembly in the sitting position; and
   an actuator operatively connected with the latch, the actuator being operable to cause the latch to unlock for adjustment of the child support assembly between the sitting position and the recumbent position.

2. The child safety seat according to claim 1, wherein the seat portion and the backrest portion are pivotally connected with each other via a pivot connection, an adjustment of the child support assembly between the sitting position and the recumbent position displacing the pivot connection relative to the base.

3. The child safety seat according to claim 2, wherein the latch is movable along an axis of the pivot connection.

4. The child safety seat according to claim 1, wherein the backrest portion is pivotally connected with the base via a first pivot connection, the seat portion and the backrest portion are pivotally connected with each other via a second pivot connection located forward relative to the first pivot connection, and the seat portion has a left and a right side respectively connected movably with the base.

5. The child safety seat according to claim 4, wherein one of the base and the seat portion has a guide slot, and the other one of the base and the seat portion is fixedly connected with a shaft portion that is located forward relative to the first pivot connection and is slidably assembled through the guide slot, the shaft portion sliding along the guide slot for facilitating a forward or rearward sliding displacement of the seat portion relative to the base during adjustment of the child support assembly between the sitting position and the recumbent position.

6. The child safety seat according to claim 4, wherein one of the base and the backrest portion has a guide slot, and the other one of the base and the backrest portion is fixedly connected with a shaft portion that is located forward relative to the first pivot connection and is slidably assembled through the guide slot, the shaft portion sliding along the guide slot for facilitating a forward or rearward sliding displacement of the backrest portion relative to the base during adjustment of the child support assembly between the sitting position and the recumbent position.

7. The child safety seat according to claim 4, wherein one of the base and the backrest portion has a guide slot, and the first pivot connection sliding along the guide slot when the child support assembly is adjusted between the sitting position and the recumbent position.

8. The child safety seat according to claim 7, wherein one of the base and the backrest portion has a second guide slot located forward relative to the first pivot connection, and the other one of the base and the backrest portion is fixedly connected with a shaft portion that is slidably assembled through the second guide slot, the shaft portion sliding along the second guide slot when the child support assembly is adjusted between the sitting position and the recumbent position.

9. The child safety seat according to claim 1, wherein the latch and the actuator are coupled with the child support assembly, the latch being disengaged from the first and second openings on the sidewall of the base for adjustment of the child support assembly between the sitting position and the recumbent position.

10. The child safety seat according to claim 9, wherein the latch and the actuator are coupled with one of the backrest portion and the seat portion, and are movable therewith relative to the base and the other one of the backrest portion and the seat portion during adjustment of the child support assembly between the sitting position and the recumbent position.

11. The child safety seat according to claim 9, wherein the child support assembly is further provided with a spring operable to apply a spring force for biasing the latch toward a locking state.

12. The child safety seat according to claim 9, wherein the latch slides transversally relative to the child support assembly at one of a left and a right side thereof for engaging or disengaging the base.

13. The child safety seat according to claim 12, wherein the actuator is operatively connected with the latch via a resilient arm that bends toward the left or right side of the child support assembly where is disposed the latch.

14. The child safety seat according to claim 13, wherein the actuator is pivotally or slidably connected with the child support assembly, the actuator being operable to cause sliding of the resilient arm.

15. The child safety seat according to claim 1, further including a carrying handle pivotally connected with the base.

16. A child safety seat comprising:
a base for providing support on a vehicle seat;
a child support assembly coupled with the base, the child support assembly including a seat portion and a backrest portion pivotally connected with each other about a pivot connection that defines a pivot axis about which the backrest portion is rotatable relative to the seat portion, the seat portion having a left and a right side respectively connected movably with the base, and the pivot connection being displaced relative to the base when the child support assembly is adjusted relative to the base between a first and a second position;
a latch operable to lock the child support assembly with the base in the first or second position, the latch being movable along the pivot axis of the pivot connection; and
an actuator operatively connected with the latch, the actuator being operable to cause the latch to unlock for adjustment of the child support assembly between the first and second position.

17. The child safety seat according to claim 16, wherein one of the base and the seat portion has a guide slot, and the other one of the base and the seat portion is fixedly connected with a shaft portion that is slidably assembled through the guide slot, the shaft portion sliding along the guide slot for facilitating a forward or rearward sliding displacement of the seat portion relative to the base during adjustment of the child support assembly between the first and second position.

18. The child safety seat according to claim 16, wherein one of the base and the backrest portion has a guide slot, and the other one of the base and the backrest portion is fixedly connected with a shaft portion that is slidably assembled through the guide slot, the shaft portion sliding along the guide slot for facilitating a forward or rearward sliding displacement of the backrest portion relative to the base during adjustment of the child support assembly between the first and second position.

19. The child safety seat according to claim 16, wherein the latch and the actuator are coupled with the child support assembly, the latch engaging with the base for locking the child support assembly in the first or second position, and the latch disengaging from the base for adjustment of the child support assembly between the first and second position.

20. The child safety seat according to claim 19, wherein the child support assembly is further provided with a spring operable to apply a spring force for biasing the latch toward a locking state.

21. The child safety seat according to claim 19, wherein the latch slides transversally relative to the child support assembly at one of a left and a right side thereof for engaging or disengaging the base.

22. The child safety seat according to claim 21, wherein the actuator is operatively connected with the latch via a resilient arm that bends toward the left or right side of the child support assembly where is disposed the latch.

23. The child safety seat according to claim 22, wherein the actuator is slidably connected with the child support assembly, the actuator being operable to cause sliding of the resilient arm.

24. The child safety seat according to claim 16, wherein the latch and the actuator are coupled with the seat portion, and are movable with the seat portion relative to the base and the backrest portion during adjustment of the child support assembly between the first and second position.

25. A child safety seat comprising:
a base for providing support on a vehicle seat and having a rear end;
a child support assembly coupled with the base, the child support assembly including a seat portion and a backrest portion pivotally connected with each other, the backrest portion further being pivotally connected with the base about a pivot connection located adjacent to the rear end of the base, the child support assembly being adjustable relative to the base between a sitting position and a recumbent position;

a latch operable to lock the child support assembly with the base in the sitting position or the recumbent position; and an actuator operatively connected with the latch, the actuator being operable to cause the latch to unlock for adjustment of the child support assembly between the sitting position and the recumbent position.

26. The child safety seat according to claim 25, wherein the latch is coupled with the child support assembly, and the base has a sidewall provided with a first opening and a second opening, the first opening being located above the second opening when the base rests on an external surface in a use configuration, the latch being disengaged from the second opening and engaged with the first opening to lock the child support assembly in the recumbent position, the latch being disengaged from the first opening and engaged with the second opening to lock the child support assembly in the sitting position.

\* \* \* \* \*